(12) United States Patent
Pontone et al.

(10) Patent No.: US 12,384,125 B2
(45) Date of Patent: Aug. 12, 2025

(54) METHOD AND SYSTEM FOR APPLYING A LAYER OF SOUNDABSORBING MATERIAL TO THE SURFACE OF AN INNER CAVITY OF A PNEUMATI TIRE

(71) Applicant: Bridgestone Europe NV/SA [BE/BE], Zaventem (BE)

(72) Inventors: Roberto Pontone, Rome (IT); Arnaldo Gentili, Rome (IT)

(73) Assignee: Bridgestone Europe NV/SA, Zaventem (BE)

(*) Notice: Subject to any disclaimer, the term of this patent is extended or adjusted under 35 U.S.C. 154(b) by 284 days.

(21) Appl. No.: 17/920,164

(22) PCT Filed: Apr. 30, 2021

(86) PCT No.: PCT/EP2021/061395
§ 371 (c)(1),
(2) Date: Oct. 20, 2022

(87) PCT Pub. No.: WO2021/219848
PCT Pub. Date: Nov. 4, 2021

(65) Prior Publication Data
US 2023/0173775 A1  Jun. 8, 2023

(30) Foreign Application Priority Data

Apr. 30, 2020 (IT) .................. 102020000009493

(51) Int. Cl.
*B29D 30/06* (2006.01)
(52) U.S. Cl.
CPC ..... *B29D 30/0685* (2013.01); *B29D 30/0681* (2013.01); *B29D 2030/0686* (2013.01)
(58) Field of Classification Search
CPC ............ B29D 30/0681; B29D 30/0685; B29D 2030/0686; B29D 2030/069;
(Continued)

(56) References Cited

U.S. PATENT DOCUMENTS

2011/0005660 A1* 1/2011 Ogawa ............... B29D 30/1628
156/397
2011/0100531 A1* 5/2011 Ogawa ............... B29D 30/3028
156/397

(Continued)

FOREIGN PATENT DOCUMENTS

DE   102018217579 A1   4/2020
JP   H01254411 A   10/1989
(Continued)

OTHER PUBLICATIONS

Kitamoto H, JP-2008006783-A, machine translation. (Year: 2008).*

(Continued)

*Primary Examiner* — Sedef E Paquette
(74) *Attorney, Agent, or Firm* — Patterson Intellectual Property Law, PC

(57) ABSTRACT

A method and a system for applying a layer of sound-absorbing material to the inner surface of a cavity of a pneumatic tire comprising an applicator device having an applicator roller for implementing the application of the layer of sound-absorbing material to the inner surface after the removal of a lining and arranged, in use, at a position directly facing and in proximity to the inner surface and at a distance from the inner surface that substantially approximates the thickness of the layer of sound-absorbing material; a roller for winding the lining after the separation from the layer of sound-absorbing material; and further configured to make it possible to maintain substantially uniform the speed of the applicator roller and the winding roller.

15 Claims, 2 Drawing Sheets

(58) Field of Classification Search
CPC .... B29D 2030/0691; B29D 2030/0694; B29D 2030/0695; B60C 19/00; B60C 19/002
USPC .............................................. 156/110.1, 115
See application file for complete search history.

(56) References Cited

U.S. PATENT DOCUMENTS

| | | |
|---|---|---|
| 2017/0348929 A1 | 12/2017 | Badaroux |
| 2020/0047564 A1 | 2/2020 | Boscaino et al. |
| 2020/0094503 A1 | 3/2020 | Boscaino et al. |

FOREIGN PATENT DOCUMENTS

| | | | | |
|---|---|---|---|---|
| JP | 2007168243 A | | 7/2007 | |
| JP | 2008006783 A | * | 1/2008 | ......... B29D 30/0061 |
| JP | 2008254337 A | | 10/2008 | |
| JP | 2017209806 A | | 11/2017 | |
| JP | 6551580 B1 | | 7/2019 | |
| WO | 2017005377 A1 | | 1/2017 | |

OTHER PUBLICATIONS

Kamisawa S, JP-2009160762-A, updated machine translation. (Year: 2009).*
International Searching Authority: Search Report for corresponding International Patent Application No. PCT/EP2021/061395 dated Aug. 5, 2021, 3 pages.

* cited by examiner

METHOD AND SYSTEM FOR APPLYING A LAYER OF SOUNDABSORBING MATERIAL TO THE SURFACE OF AN INNER CAVITY OF A PNEUMATI TIRE

TECHNICAL SECTOR

The present invention relates to a method and a system for applying a layer of sound-absorbing material to the surface of an inner cavity of a pneumatic tire.

PRIOR ART

As is known, a pneumatic tire comprises a toroidal carcass, which has two annular beads and supports an annular tread. Between the casing and the tread, a tread belt is interposed, which comprises a number of tread plies. Within the carcass ply, an innerliner is arranged which is airtight, constitutes an inner lining and has the function of retaining the air within the pneumatic tire in order to maintain the inflation pressure of the pneumatic tire itself over time.

In recent years the development of pneumatic tires has been directed towards pneumatic tires that are provided with an inner lining made of a sound-absorbing material for reducing the noise generated by a pneumatic tire rolling on a road surface.

The sound-absorbing material is applied to an already vulcanized pneumatic tire and preferably to the innerliner, to that area of the pneumatic tire that comes into contact with the asphalt; in particular, the sound-absorbing material is applied to the tread and, at least partially, to the side walls.

Typically, the procedure for applying the sound-absorbing material provides for the positioning of the pre-vulcanized pneumatic tire on a frame, whereupon it is blocked by means of lateral rails in such a way as to prevent any lateral translation of the pneumatic tire itself.

In response to an operator command, the sound-absorbing material application process is initiated in inserting a sound-absorbing material applicator device into the inner cavity of the pneumatic tire, in a position directly facing a surface of the inner cavity itself, the pneumatic tire is then driven into rotation by the frame using motorized rollers.

The sound-absorbing material is provided with an adhesive layer that is applied to the surface that is intended to make the connection with the inner cavity of the pneumatic tire and is protected by a removable lining (liner) that is applied at the adhesive layer.

Said applicator device is conveniently implemented by means of a movable arm which serves to move the device from a position for the application of the sound-absorbing material, wherein it is inserted into the cavity, to a position for the manipulation of the pneumatic tire, wherein it is arranged externally to the cavity, and vice versa. The applicator device comprises an applicator roller that, after the removal of the lining, is intended to implement the application of the sound-absorbing material to the surface and arranged at a position directly facing and in the vicinity of the surface of the pneumatic tire; and a roller for winding the lining, whereupon the same is wound after the separation thereof from the sound-absorbing material.

The winding roller and the applicator roller are provided with actuating means intended to bring them into rotation around the respective axes thereof at appropriate and synchronous speeds, in such a way as to prevent the lining and/or the absorbent material from tearing due to excessive tension or being too loose.

The adhesive layer that is normally used, if exposed to air, polymerizes within seconds, permanently attaching the sound-absorbing material to the inner cavity. During the application of the sound-absorbing material it is therefore necessary, just before application, to separate the lining from the sound-absorbing material (peeling-off) in such a way as to leave the adhesive exposed to air for the shortest possible period of time.

Moreover, it is of paramount importance that, during the application within the cavity, the sound-absorbing material does not undergo elongations or compressions which, after a few thousand kilometers of use of the pneumatic tire, may lead to cracks within the sound-absorbing material itself.

DESCRIPTION OF THE INVENTION

The object of the present invention is therefore to provide a method for applying a layer of sound-absorbing material to the surface of an inner cavity of a pneumatic tire that is free from the disadvantages of the state of the art and that is, in particular, easy and inexpensive to implement.

A further object of the present invention is accordingly to provide a system for applying a layer of sound-absorbing material to the surface of an inner cavity of a pneumatic tire that is free from the disadvantages of the state of the art and that is, in particular, easy and inexpensive to manufacture.

According to the present invention a method and a system are provided for applying a layer of sound-absorbing material to the surface of an inner cavity of a pneumatic tire according to that determined within the attached claims.

BRIEF DESCRIPTION OF THE DRAWINGS

The present invention is now described with reference to the attached drawings, which illustrate several non-limiting exemplary embodiments, wherein.

PREFERRED EMBODIMENTS OF THE INVENTION

Figure 1:
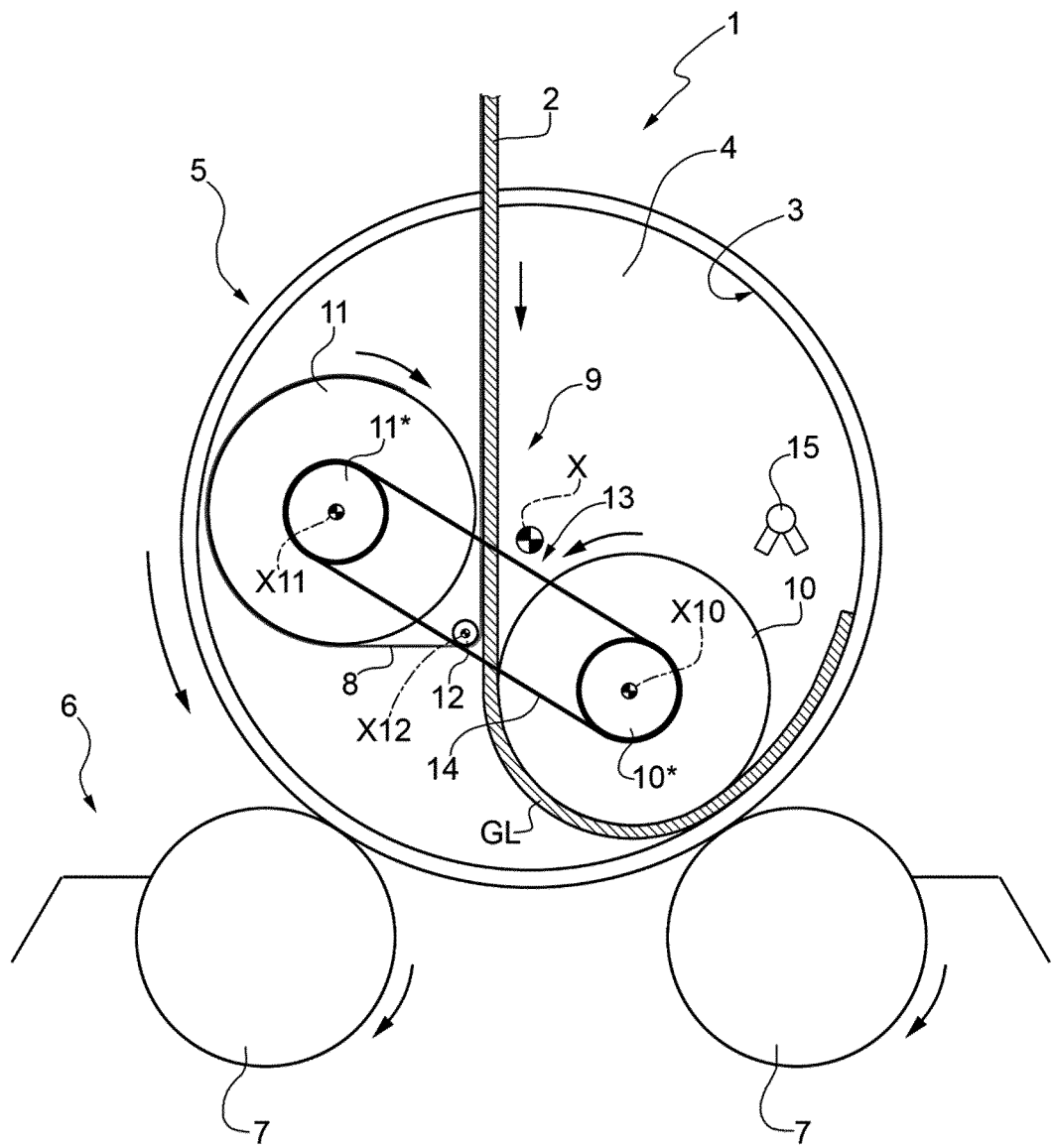
FIG. 1 is a schematic side view, and with parts removed for clarity, of a system that has been implemented for the application of a layer of sound-absorbing material to the surface of the inner cavity of a pneumatic tire, implemented according to the present invention.

With reference to FIG. 1, the numeral 1 denotes, in the entirety thereof, a system 1 for the application of a layer 2 of sound-absorbing material to the surface 3 of an inner cavity 4 of a pneumatic tire 5. It is to be understood that the phrase "profile of the inner cavity 4 of a pneumatic tire 5," refers to a surface profile of the pneumatic tire 5.

The sound-absorbing material is attached (preferably glued) to the surface 3.

The layer 2 of sound-absorbing material preferably has a uniform thickness. It has been experimentally shown that one layer 2 of sound-absorbing material, having a thickness of between 20 mm and 40 mm, makes it possible to obtain satisfactory performance in terms of noise reduction; advantageously, the layer 2 of sound-absorbing material has a thickness of between 25 mm and 35 mm, preferably equal to 30 mm.

The layer 2 of sound-absorbing material is advantageously made from any porous material with an open/closed cell finish chosen from amongst: expanded polyurethane, polystyrene, expanded melamine, Ethylene-Propylene Diene Monomer (EPDM). The density of the sound-absorbing material is between 15 kg/m$^3$ and 120 kg/m$^3$. Preferably, the density of the sound-absorbing material is between 15 kg/m$^3$ and 80 kg/m$^3$; in more detail, the density of the sound-absorbing material is preferably between 15 kg/m$^3$ and 50 kg/m$^3$.

The pneumatic tire 5 is arranged on a frame 6 that is suitable for supporting, and bringing into rotation around a central X axis thereof, the pneumatic tire 5 by means of actuating means 7, in particular by means of motorized rollers 7. The frame 6 is designed to bring the pneumatic tire 5 into rotation at a substantially constant speed and preferably between 1 and 15 m/min. Preferably, the pneumatic tire 5 is housed within the frame 6 in such a way as to prevent any lateral translation of the pneumatic tire 5 itself during the rotational movement around the X axis.

The layer 2 of sound-absorbing material is provided with an adhesive layer GL that is evenly applied to the surface that is intended to make the connection with the surface 3; the layer 2 of sound-absorbing material which is provided with a removable lining 8 (liner) applied to the adhesive layer GL is fed to the system 1 in order to allow for the winding of the layer 2 of sound-absorbing material.

The layer 2 of sound-absorbing material is wound onto a storage reel (not shown) which is arranged externally to the system 1. The layer 2 of sound-absorbing material wound onto the storage reel has a length that is intended to cover slightly less than the entire surface 3.

According to what is shown in FIG. 1, the system 1 comprises a device 9 for applying the layer 2 of sound-absorbing material.

Said applicator device 9 is conveniently implemented by means of a robot/manipulator (not shown) that is provided with a movable arm which serves to move the device from a position for the application of the layer 2 of sound-absorbing material, wherein it is inserted into the cavity 4 of the pneumatic tire, to a position for the manipulation of the pneumatic tyre 5, wherein it is arranged externally to the cavity 4.

The applicator device 9 comprises an applicator roller 10 which is intended to implement the application of the layer 2 of sound-absorbing material to the surface 3 after the separation thereof from the lining 8. The applicator roller 10 is arranged at a position directly facing and in proximity to the surface 3.

In more detail, the applicator roller 10 is arranged at a distance from the surface 3 that is variable as a function of the compression applied to the layer 2 of sound-absorbing material and necessary in order to produce the strength of adhesion between the adhesive layer GL and the surface 3. Furthermore, the applicator roller 10 is arranged at a distance from the surface 3 in such a way as to make it possible to recover the lining 8 and to apply the layer 2 of sound-absorbing material without stretching or compressing the layer 2 of sound-absorbing material itself.

The applicator device 9 then comprises a roller 11 for winding the lining 8, whereupon the lining 8 is wound after the separation thereof from the layer 2 of sound-absorbing material; and a roller 12 for releasing the lining 8. The releasing roller 12 is substantially interposed between the winding roller 11 and the applicator roller 10 and is intended to separate the layer 2 of sound-absorbing material from the lining 8, which is subsequently rolled onto the winding roller 11. The releasing roller 12 is substantially placed alongside the layer 2 of sound-absorbing material at the area wherein the separation of the layer 2 of sound-absorbing material from the lining 8 occurs. The releasing roller 12, the winding roller 11 and the applicator roller 10 are provided with respective axes of rotation $X_{10}$, $X_{11}$, $X_{12}$, that are parallel therebetween. The applicator roller 10 and the winding roller 11 are made to rotate, when in use, in opposite directions therebetween; clearly, the releasing roller 12 and the winding roller 11 are made to rotate, when in use, in the same direction.

The winding roller 11 is preferably provided with a slit (not shown) formed on the surface and in a radial direction, and is intended to accommodate one end of the lining 8 in such a way as to prevent, when the system 1 is started, the lining 8 from slipping and thereby compromising the winding of the lining 8 itself.

The winding roller 11 and the applicator roller 10 have dimensions (diameter) that are substantially uniform therebetween.

The releasing roller 12 has dimensions (diameter) that are smaller than the dimensions of the winding roller 11 and/or the applicator roller 10; in particular, the ratio between the diameter of the releasing roller 12 and the diameter of the winding roller 11 and/or the applicator roller 10 is between 1:5 and 1:2, preferably equal to 1:4 or 1:3.

It should be emphasized that, according to a preferred embodiment, the winding roller 11 and the applicator roller 10 are not provided with actuating means and that the rotation of the pneumatic tire 5 imparted by the frame 6 also drives into rotation the winding roller 11 and the applicator roller 10, with a synchronous speed.

According to a further variant, the winding roller 11 and the applicator roller 10 are provided with respective actuating means (not shown) that are intended to bring them into rotation around the respective axes $X_{10}$ and $X_{11}$ thereof. The actuating means are implemented in such a way as to regulate the speed of rotation of the rollers 10 and 11, in order to prevent the lining 8 and/or the layer 2 of sound-absorbing material being torn due to an excessive tension or too loose.

Finally, the applicator device 9 comprises means 13 for synchronizing the speed of the winding roller 11 and the applicator roller 10. The synchronization means 13 are implemented in order to make it possible to maintain substantially uniform the peripheral speed of the applicator roller 10 and the winding roller 11.

The synchronization means 13 are implemented by means of a transmission 14, in particular by means of a belt 14, that connects the shafts 11\* and 10\* respectively of the winding roller 11 and of the applicator roller 10. During the rotation of the pneumatic tire 5, the synchronization means 13 drive into rotation the winding roller 11 in the opposite direction with respect to the direction of rotation of the pneumatic tire 5 (and of the applicator roller 10), thereby allowing for the winding of the lining 8.

The applicator device 9 also comprises an element 15 for locking the layer 2 of sound-absorbing material.

Figure 2:
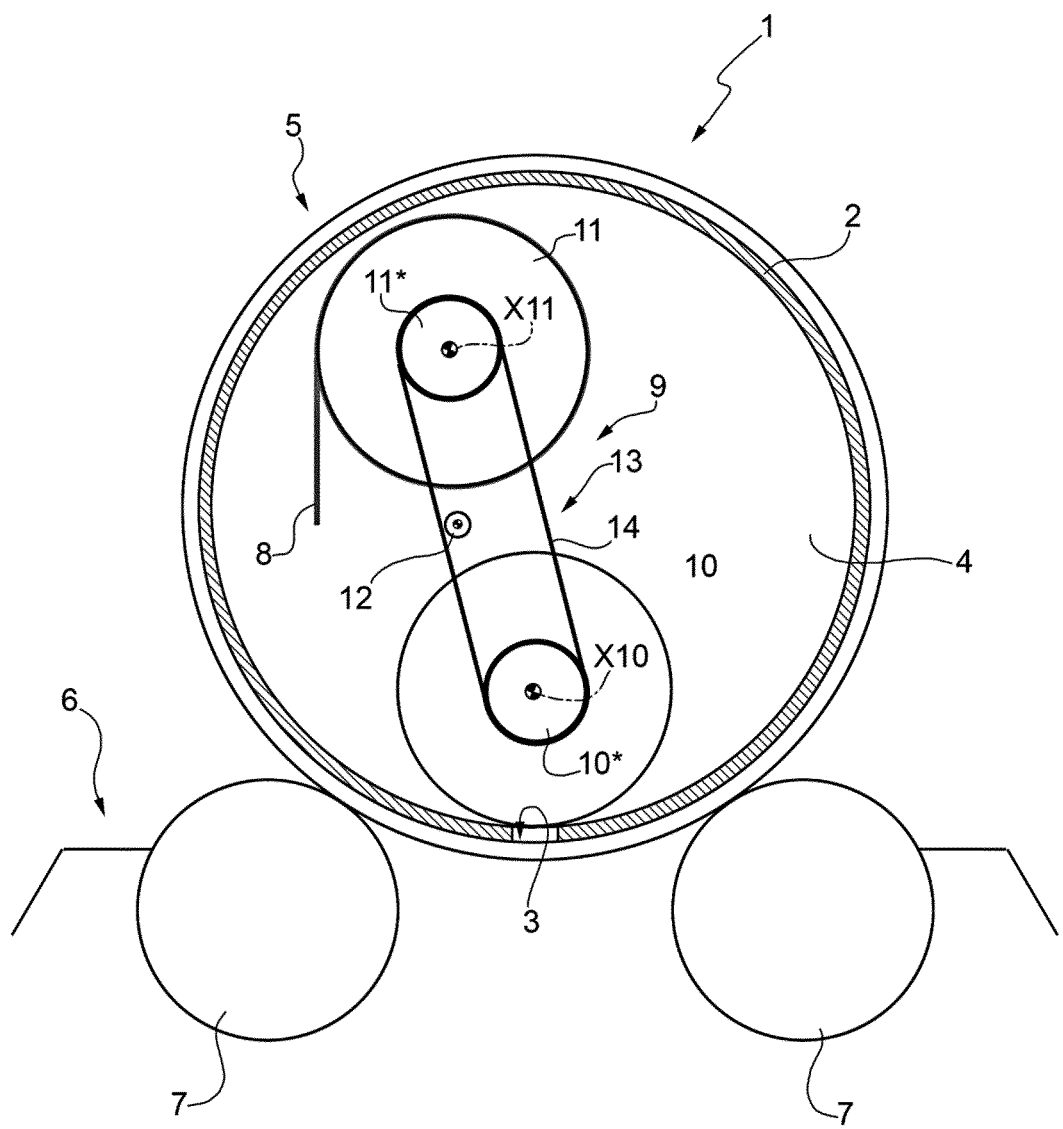
FIG. 2 shows the system of FIG. 1 at the end of the step for the application of the layer of sound-absorbing material to the surface of the inner cavity of the pneumatic tire.

Hereinafter there will be described the method of operation of the system 1, which includes, in succession, the following steps:

an operator or, alternatively, an automatic manipulator arranges the pneumatic tire 5 on the frame 6 and blocks it by means of side rails in such a way as to prevent any lateral translation of the pneumatic tire 5 itself;

at an initial portion, the lining 8 is manually separated (by an operator) from the layer 2 of sound-absorbing material; the initial end of the layer 2 of sound-absorbing material is attached to the locking element 15, whilst the initial end of the lining 8 is inserted into the slot of the roller winding 11;

the robot/manipulator is arranged at the application position within the cavity 4;

the applicator roller 10 is arranged at a distance from the surface 3 that is variable as a function of the layer 2 of sound-absorbing material and determined in such a way that the layer 2 of sound-absorbing material is compressed to a thickness of between 5 and 15 mm, preferably of between 8 and 13 mm;

the pneumatic tire 5 is driven into rotation around the axis X by the frame 6, whilst the application begins of the layer 2 of sound-absorbing material on the surface 3;

during the rotation of the pneumatic tire 5 around the axis X, the synchronization means 13 make it possible for the winding roller 11 to rotate in the opposite direction to the direction of rotation of the pneumatic tire 5 and to wrap the lining 8 onto said winding roller 11;

during the rotation of the pneumatic tire 5 around the axis X, the pressure exerted by the applicator roller 10 on the pneumatic tire 5 makes it possible for the applicator roller 10 itself to rotate in same direction of rotation as the pneumatic tire 5; the layer 2 of sound-absorbing material is fed between the applicator roller 10 and the surface 3 (in particular, according to a preferred embodiment, it is fed below the applicator roller 10) and, finally, connected to the surface 3;

once the layer 2 of sound-absorbing material has been applied over the entire surface 3 (as shown in FIG. 2) the frame 6 is stopped such that the robot/manipulator can be arranged at the manipulation position, externally to the cavity 4, and the pneumatic tire 5 can be removed from the frame 6.

It is important to highlight that the applicator device 9 is implemented in such a way as to leave only a few centimeters of the adhesive layer GL exposed prior to being applied to the surface 3; in other words, the separation between the lining 8 and the layer 2 of sound-absorbing material takes place substantially in the vicinity of the area wherein the connection takes place of the layer 2 of sound-absorbing material to the surface 3.

Moreover, the presence of the synchronization means 13 makes it possible to maintain substantially uniform the speed of the applicator roller 10, and the winding roller 11, and to prevent the winding of the lining 8 onto said winding roller 11 from stretching or compressing the layer 2 of sound-absorbing material being applied to the surface 3.

The advantages of the system 1 described in the preceding discussion are therefore clearly evident.

The lack of dedicated actuating means for the applicator roller 10 and the winding roller 11 (which are driven into rotation as a result of the motorized rollers 7) renders the system 1 advantageously economical to produce. Moreover, the presence of the synchronization means 13, implemented by means of a transmission member 14, in particular by means of a belt 14, prevents, by rotating the applicator roller 10 and the winding roller 11 at the same speed, the strip 2 of sound-absorbing material from undergoing elongations or compressions which may lead to cracks within the sound-absorbing material itself. Finally, the strip 2 of sound-absorbing material is separated from the lining 8 just before being applied to the surface 3, in such a way as to leave the adhesive layer GL exposed to air for the shortest possible period of time.

The invention claimed is:

1. A system for applying a layer of sound-absorbing material to an inner surface of a cavity of a pneumatic tire, the system comprising:
   an applicator device configured to apply the layer of sound-absorbing material to the inner surface and which is movable internally and externally with respect to the cavity;
   wherein the layer of sound-absorbing material is fed to the applicator device, which is provided with an adhesive layer that is applied to a surface configured to connect with the inner surface and a removable lining applied to the adhesive layer;
   the applicator device further comprising:
      a single applicator roller configured to apply and continuously attach the layer of sound-absorbing material to the inner surface after removal of the lining while simultaneously compressing the layer of sound-absorbing material against the inner surface of the cavity to cause adhesion between the adhesive layer and the inner surface of the cavity, wherein the applicator roller is arranged, in use, at a position directly facing and in proximity to the inner surface;
      a winding roller configured to wind the lining after separation from the layer of sound absorbing material; and
      synchronization means for maintaining substantially uniform a speed of the applicator roller and of the winding roller.

2. The system of claim 1, wherein the winding roller and the applicator roller are each provided with respective shafts and the synchronization means comprises a belt that connects said shafts.

3. The system of claim 1, further comprising actuating means for rotating the pneumatic tire around a central axis thereof, wherein the rotation of the pneumatic tire imparted by the actuating means drives into rotation, in opposite directions, both the winding roller and the applicator roller.

4. The system of claim 1, comprising a releasing roller configured to release the lining that is substantially placed alongside the layer of sound-absorbing material at an area wherein the separation of the layer of sound-absorbing material from the lining occurs.

5. The system of claim 4, wherein the releasing roller, the winding roller, and the applicator roller are provided with respective axes of rotation that are parallel therebetween.

6. The system of claim 1, wherein the winding roller and the applicator roller have respective diameters that are uniform therebetween.

7. The system of claim 6, comprising a releasing roller configured to release the lining and having a diameter that is smaller than the respective diameter of the winding roller, wherein a ratio between the diameter of the releasing roller and the diameter of the winding roller is between 1:5 and 1:2.

8. The system of claim 7, wherein the ratio between the diameter of the releasing roller and the diameter of the winding roller is equal to 1:4 or 1:3.

9. The system of claim 1, wherein the winding roller is provided with a slit formed on the surface and in a radial direction and is configured to accommodate one end of the lining.

10. A method for applying a layer of sound-absorbing material to an inner surface of a cavity of a pneumatic tire using the applicator device of claim 1, the method comprising:
- arranging the applicator device within the cavity;
- arranging the applicator roller at a distance from the inner surface that is variable as a function of one or more characteristics of the layer of sound absorbing material;
- driving into rotation the pneumatic tire around an axis thereof;
- bringing into rotation, at uniform speed and in opposite directions, the winding roller and the applicator roller during the rotation of the pneumatic tire, wherein the applicator roller is driven into rotation in the same direction of rotation as the pneumatic tire and the layer of sound-absorbing material is fed between the applicator roller and the inner surface and is connected to the inner surface;
- continuously attaching and simultaneously compressing the layer of sound-absorbing material to adhere the sound-absorbing material to the inner surface of the cavity of the tire; and
- extracting the applicator device from the cavity.

11. The method of claim 10, wherein the winding roller is driven into rotation in the opposite direction to that of the pneumatic tire so as to wind the lining onto the winding roller after separation thereof from the layer of sound-absorbing material.

12. The method of claim 10, wherein the applicator roller is arranged at a distance from the inner surface that is variable as a function of a compression applied to the layer of sound-absorbing material and necessary to produce a strength of adhesion between the adhesive layer and the inner surface.

13. The method of claim 10, wherein the applicator roller is arranged at a distance from the inner surface determined such that the layer of sound-absorbing material is compressed to a thickness of between 5 and 15 mm.

14. The method of claim 13, wherein the layer of sound-absorbing material is compressed to a thickness of between 8 and 13 mm.

15. The method of claim 10, further comprising manually separating an initial section of the lining from the layer of sound-absorbing material and inserting it into a surface slit formed on the winding roller.

* * * * *